Patented Nov. 18, 1924.

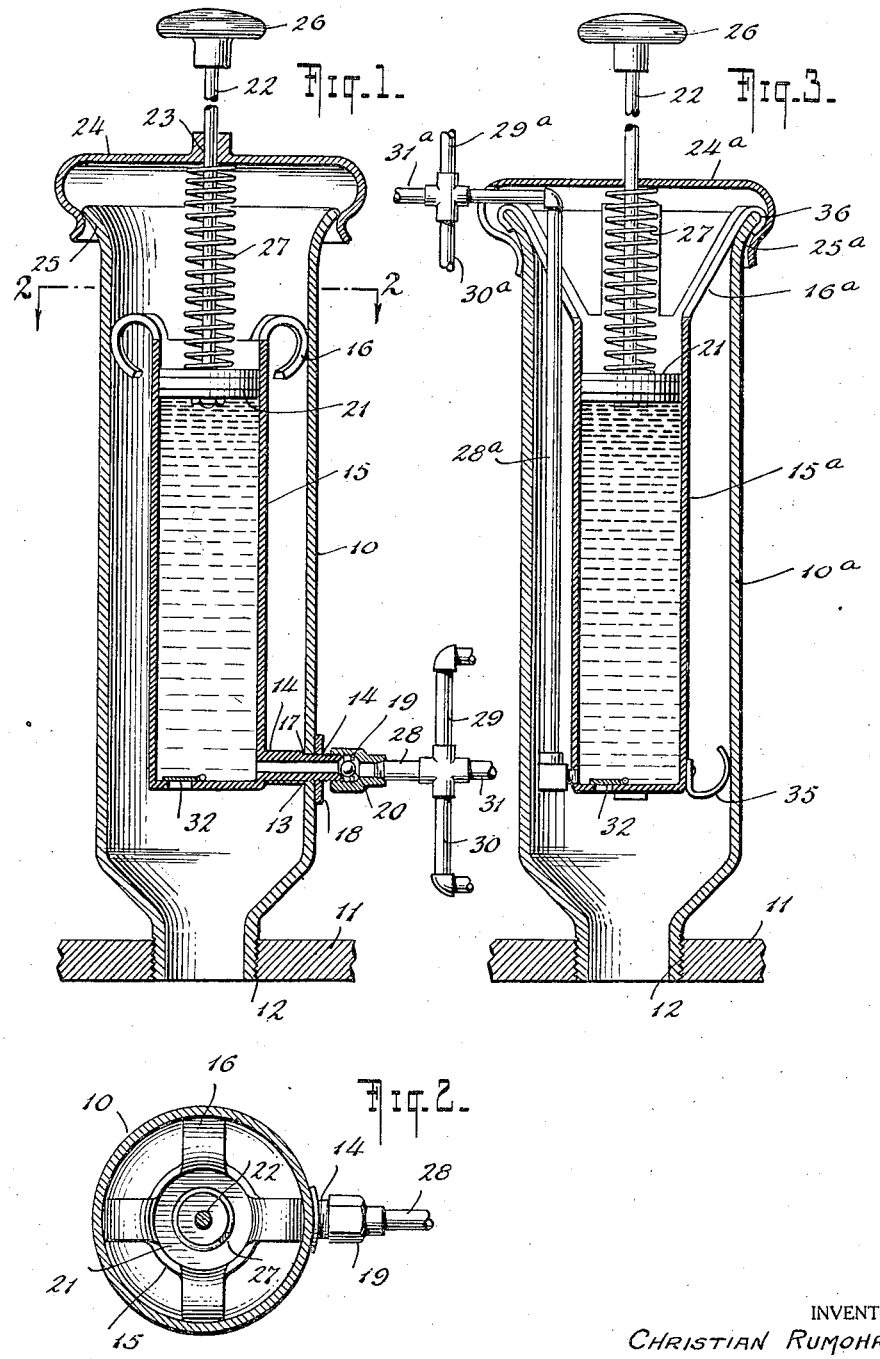

1,516,062

UNITED STATES PATENT OFFICE.

CHRISTIAN RUMOHR, OF NEW YORK, N. Y.

AUTOMOBILE LUBRICATING DEVICE.

Application filed October 20, 1923. Serial No. 669,670.

*To all whom it may concern:*

Be it known that I, CHRISTIAN RUMOHR, a citizen of the Republic of Germany, residing at New York, county of New York, and State of New York, have invented certain new and useful Improvements in Automobile Lubricating Devices, of which the following is a specification.

This invention relates to a device for lubricating automobile parts, and has for its object to provide a simple compact and inexpensive device, which may be readily installed upon most existing makes of automobiles, or which may be incorporated in the manufacture of the automobile as a part thereof; and by means of which those parts of the automobile which only require periodic oiling but the oiling of which is frequently neglected will be automatically oiled as a result of the supplying of oil to the crank case.

Experience has proven that while the average automobile owner, who takes care of his own car, will usually keep sufficient oil in the crank case of his machine, he will be quite liable to neglect to oil regularly such parts as the springs, clutch collar, rocker arms, etc., thereby permitting a rapid deterioration of these parts to occur. In order that the oiling of these usually neglected parts may occur when oil is supplied to the crank case an object of the present invention, considered in its more specific aspects, is to provide a receptacle in the path of the oil flowing to the crank case and preferably in the breather pipe, which receptacle will intercept a portion of the oil being supplied to the crank case; and to provide suitable supply pipes leading from said receptacle to the other parts of the car, through which pipes the lubricant is automatically supplied in small quantities by means of a plunger within said receptacle.

For the accomplishment of these and such further objects as will hereinafter be apparent to those skilled in the art to which this appertains, the invention consists in the construction, combination and arrangement of parts herein specifically described and illustrated in the accompanying drawings, wherein is shown a preferred embodiment of the invention, but it is to be understood that changes, variations and modifications may be resorted to which fall within the scope of the claims hereunto appended.

In the drawings forming a portion of this specification:

Fig. 1 is a central vertical section through an automobile breather pipe showing a lubricating device constructed in accordance with the principles of my invention as a part of a regular installation.

Fig. 2 is a section on the line 2—2 of Fig. 1, and

Fig. 3 is a modification of the form of construction shown in Fig. 1, showing a device particularly adapted for convenient attachment to an existing machine.

Referring to Figs. 1 and 2, the numeral 10 indicates a breather pipe, which is secured to the crank case 11, of an automobile by means of the screw threads 12. The breather pipe is provided with an aperture 13, a short distance from the crank case, which aperture is adapted to snugly receive a nipple 14, which projects laterally from the lower end of an oil receptacle 15, the upper end of which receptacle is provided with a plurality of laterally projecting spring arms 16, bent to form a hook shape, and adapted to contact with the inner circumference of the breather pipe 10 to hold the receptacle firmly in place substantially centrally of said breather pipe.

The outer end of the nipple 14 is reduced to provide a shoulder 17, which abuts the inner face of the pipe 10 adjacent the aperture 13, and a thin nut 18 is screwed on the screw threaded projecting end of said nipple to hold the nipple and lower end of the receptacle securely in position and to provide an oil tight joint; a suitable packing or gasket being provided at this point if desired.

A valve casing 19 is also screwed onto the projecting end of nipple 14 and contains therein a ball 20, which is adapted to seat against a suitable valve seat provided on the outer end of nipple 14 to form a one way valve device.

A plunger or piston 21 is slidably mounted within the receptacle 15 and has secured thereto a piston rod 22, which projects upwardly from said piston and through a suitable bearing 23 provided in a cover plate 24, which is adapted to be resiliently snapped over and held in place by the outwardly turned flange 25 of the breather pipe 10. The outer end of the piston rod 22 has a handle 26 suitably secured thereto, and a coiled expansion spring 27 which is coiled about said rod, has its ends confined between the upper face of the piston 21 and the lower face of the cover plate 24, to normally urge said piston downwardly into the receptacle 15 when the plunger and cover plate 24 have been placed in position.

The valve casing 19 serves as a coupling, to which is connected a small pipe line 28, having any desirable number of branches as 29, 30 and 31, which lead to the parts of the automobile which it is desired to lubricate; branch 29, for example, leading to the valve rocker arms, branch 30 to the clutch collar and branch 31 to the springs and bolts. As it is desirable to keep the pipe lines 28 to 31 filled with oil at all times, an air check valve 32 is preferably provided in the base of the receptacle 15 to permit air to be drawn into the receptacle when the plunger is drawn upwardly or removed therefrom, thus preventing the formation of a suction or vacuum which would tend to withdraw the oil from said pipe lines.

The operation of the device is as follows, when it is desired to fill the crank case of the engine with oil it will be necessary to remove the cover plate 24, it being understood that the cover plate is sufficiently resilient to permit its removal from the flange 25. The removal of the cover plate to pour the oil into the breather pipe necessarily involves the withdrawal of the piston 21, and as the oil is poured into the breather pipe the receptacle 15, which is directly in the path of the oil, will be immediately filled with oil. After the receptacle 15 has been filled the remainder of the oil poured into the breather pipe will flow down around the sides of the receptacle into the crank case. Cover plate 24 is now replaced, the piston 21 being introduced into the receptacle 15 as the cover plate is placed in position. The diameter of the outlets of the pipe 28 and its branches are sufficiently restricted to permit only a small quantity of oil to pass therethrough thus causing a sufficient back pressure on the oil within the receptacle to cause spring 27 to be compressed and maintain a pressure on the piston 21, whereby the piston will be gradually forced downwardly to feed the oil through the branches to the parts to be oiled.

In the modification shown in Fig. 3 instead of leading the supply pipe through the side of the breather pipe 10ª, which would require taking the pipe off and drilling a hole through the same, the pipe 28ª is led upwardly through the breather pipe and through the cover plate 24ª to be connected with the branches 29ª, 30ª and 31ª, thus making the installation of the device an easy matter for any car owner.

As the lower end of the receptacle 15ª is not rigidly connected to the breather pipe as in the form shown in Fig. 1, I preferably provide a plurality of spring clips 35 to center the receptacle and hold it properly braced within the breather pipe. A different form of supporting arms 16 are shown in Fig. 2, which consist of the arms 16ª having their upper ends bent as at 36 to engage over the flange 25ª of the breather pipe 10ª. The construction of the plunger 21 and spring 27, and the operation of the device shown in Fig. 2 is similar to that shown in Fig. 1.

Having thus described my invention what I claim as new and desire to secure by Letters Patent, is:

1. The combination with the breather pipe of an automobile, of a receptacle interposed within said breather pipe to intercept a portion of the oil being poured into said pipe to the crank case of the automobile, connections leading from said receptacle to certain of such parts of the automobile as require periodic oiling, whereby the intercepted portion of said oil will be supplied to said parts and a piston within said receptacle to force the oil in said receptacle through said connections.

2. The combination with the breather pipe of an automobile, of a receptacle interposed within said breather pipe to intercept a portion of the oil being poured into said pipe to the crank case of the automobile, connections leading from said receptacle to certain of such parts of the automobile as require periodic oiling, whereby the intercepted portion of said oil will be supplied to said parts, a piston within said receptacle, and means to urge said piston into said receptacle to force the oil contained therein through said connections.

3. The combination with the breather pipe of an automobile, of a receptacle interposed within said breather pipe to intercept a portion of the oil being poured into said pipe to the crank case of the automobile, connections leading from said receptacle to certain of such parts of the automobile as require periodic oiling, whereby the intercepted portion of said oil will be supplied to said parts, a piston within said receptacle, and resilient means to normally urge said piston into said receptacle to force the oil contained therein through said connections.

4. The combination with a breather pipe of an automobile, of a receptacle mounted within said pipe to intercept a portion of the oil being poured into said pipe to the crank case of the automobile, a cover plate detachably mounted on said breather pipe, connections leading from said receptacle to certain of such parts of the automobile as require periodic oiling and a piston, slidably connected with said cover plate and extending into said receptacle, to force the intercepted portion of the oil through said connections.

5. The combination with a breather pipe of an automobile, of a receptacle mounted within said pipe to intercept a portion of the oil being poured into said pipe to the crank case of the automobile, a cover plate detachably mounted on said breather pipe, connections leading from said receptacle to certain of such parts of the automobile as require periodic oiling, a piston rod slidably mounted on said cover plate, and a piston secured to the end of said piston rod slidably mounted within said receptacle to force the intercepted portion of said oil within said receptacle through said connections, said piston rod and piston being detachable with said cover plate as a unitary structure.

6. The combination with a breather pipe of an automobile, of a receptacle mounted within said pipe to intercept a portion of the oil being poured into said pipe to the crank case of the automobile, a cover plate detachably mounted on said breather pipe, connections leading from said receptacle to certain of such parts of the automobile as require periodic oiling, a piston rod slidably mounted within said cover plate, a piston secured to the end of said piston rod slidably mounted within said receptacle, and resilient means confined between said cover plate and piston to urge said piston inwardly of said receptacle, whereby the intercepted portion of said oil within said receptacle will be forced through said connections.

7. The combination with the breather pipe of an automobile, of a receptacle detachably mounted within said breather pipe, means to hold said receptacle in substantially concentric relationship to said breather pipe, connections leading from said receptacle to certain of such parts of the automobile as require periodic oiling and a piston slidably mounted within said receptacle to force the oil contained therein through said connections.

8. The combination with the breather pipe of an automobile, of a receptacle mounted within said breather pipe to intercept a portion of the oil being poured into said pipe to the crank case of the automobile, connections leading from said receptacle to certain of such parts of the automobile as require periodic oiling and means to force the oil within said receptacle through said connections, comprising a unitary assemblage consisting of a cover plate for said breather pipe, a piston slidably connected therewith and adapted to fit slidably within said receptacle; said assemblage being detachably secured to said breather pipe, whereby when said cover plate is removed from or secured to said pipe, said piston will be withdrawn from and engaged within said receptacle respectively.

In testimony whereof I have affixed my signature.

CHRISTIAN RUMOHR.